United States Patent
Kurup et al.

(10) Patent No.: US 10,102,560 B1
(45) Date of Patent: Oct. 16, 2018

(54) IDENTIFYING CHILD NODE CORRELATIONS

(71) Applicant: Amazon Technologies, Inc., Seattle, WA (US)

(72) Inventors: Madhu Madhava Kurup, Bellevue, WA (US); Grant Michael Emery, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 330 days.

(21) Appl. No.: 15/079,525

(22) Filed: Mar. 24, 2016

(51) Int. Cl.
*G06Q 30/06* (2012.01)

(52) U.S. Cl.
CPC .................... *G06Q 30/0631* (2013.01)

(58) Field of Classification Search
CPC ...................................... G06Q 30/06
USPC ............. 705/26.1; 707/721, 736, 777
See application file for complete search history.

(56) References Cited

U.S. PATENT DOCUMENTS

| | | | | |
|---|---|---|---|---|
| 2004/0143600 | A1* | 7/2004 | Musgrove | G06F 17/30864 |
| 2012/0191719 | A1* | 7/2012 | Musgrove | G06F 17/30864 |
| | | | | 707/740 |
| 2014/0149105 | A1* | 5/2014 | Lamba | G06F 17/2765 |
| | | | | 704/9 |
| 2016/0034757 | A1* | 2/2016 | Chhichhia | G06K 9/00469 |
| | | | | 382/206 |
| 2017/0103434 | A1* | 4/2017 | Hurwitz | G06Q 30/0601 |

* cited by examiner

*Primary Examiner* — Mila Airapetian
(74) *Attorney, Agent, or Firm* — Thomas | Horstemeyer, LLP (57) ABSTRACT

Disclosed are various embodiments for identifying correlations between child nodes of a taxonomy. A correlation service identifies a correlation between parent nodes of the taxonomy. A data set such as an interaction history is filtered according to the parent node correlation. The filtered data set is then used to identify correlations between the respective child nodes of the correlated parent nodes.

20 Claims, 4 Drawing Sheets

IDENTIFYING CHILD NODE CORRELATIONS

BACKGROUND

Items may be organized into a taxonomy of parent nodes and child nodes. Activity with respect to one taxonomy node may be used to find correlations with other taxonomy nodes. Problems may arise when using activity across multiple child nodes of a parent node to find a related taxonomy node for the parent.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Electronic commerce systems may organize a plurality of items into a taxonomy. The taxonomy can include parent taxonomy nodes which group or classify one or more child taxonomy nodes. The child taxonomy nodes may serve as parent taxonomy nodes to further group lower levels of child taxonomy nodes, or correspond to respective items. For example, a parent taxonomy node may correspond to a t-shirt for a sports league. Child taxonomy nodes descendent from this parent taxonomy node may correspond to different variations of the t-shirt, such as a variation for each team in the league.

Identifying similarities between taxonomy nodes may be used to generate suggestions or identify related items. For example, when a user is browsing a product detail page for an item, the product detail page may include suggestions for products browsed or purchased by users who browsed this product detail page, and the suggested products may be classified into another taxonomy node. As another example, shipments of goods can be used to identify goods related by location. These similarities can then be used to optimize the storage of items in distribution centers or storage facilities.

Typically, such a system may aggregate or "roll up" the interaction data of child nodes in order to identify correlated taxonomy nodes for the parent. Using the above example, interactions with respect to each variant of the t-shirt may be used to identify a product related to the t-shirt overall. This allows for a larger pool of data to be drawn from, thereby increasing signal and reducing noise when finding statistical correlations.

A consequence of this approach is that the resulting correlation across parent taxonomy nodes lacks correlations between child taxonomy nodes. When recommending a product or other item using these correlations, a child node should be selected for the final recommendation. Continuing with the above-example, a correlation can be identified that relates the parent node for a t-shirt across all teams to a parent node for caps, also having child taxonomy nodes for each sports team in the league. When a user browses the product detail page for a t-shirt of a given team, a link may be presented to one or more league caps. As the identified correlation in this example is across the parent nodes of the t-shirts and the caps for the particular league, the system must select a child node of the cap to link to. Depending on the criteria used, this may result in recommending a cap associated with a team of the league different from the team represented on the t-shirt to which the cap is being linked.

For example, the system may select a child node for recommendation based on highest sales or other activity. If the user is browsing a t-shirt for a less popular team, the recommended cap may be for a more popular team, but less relevant to the user. In order to present the most relevant recommendations, the child node should be optimally selected.

A correlation service may identify relationships between parent nodes using the aggregated or "rolled up" interaction histories for child nodes. The correlation service then uses the identified parent node correlations to select a subset of the interaction history relevant to the correlated parent nodes. Using this limited set of the interaction history, a subsequent correlation identification is performed to identify correlations between the child nodes of the correlated parent nodes. In using the filtered set of interaction histories to identify correlations between the child nodes, noise is reduced that may be otherwise present when using a broader portion of the interaction history.

In the following discussion, a general description of the system and its components is provided, followed by a discussion of the operation of the same.

Figure 1:
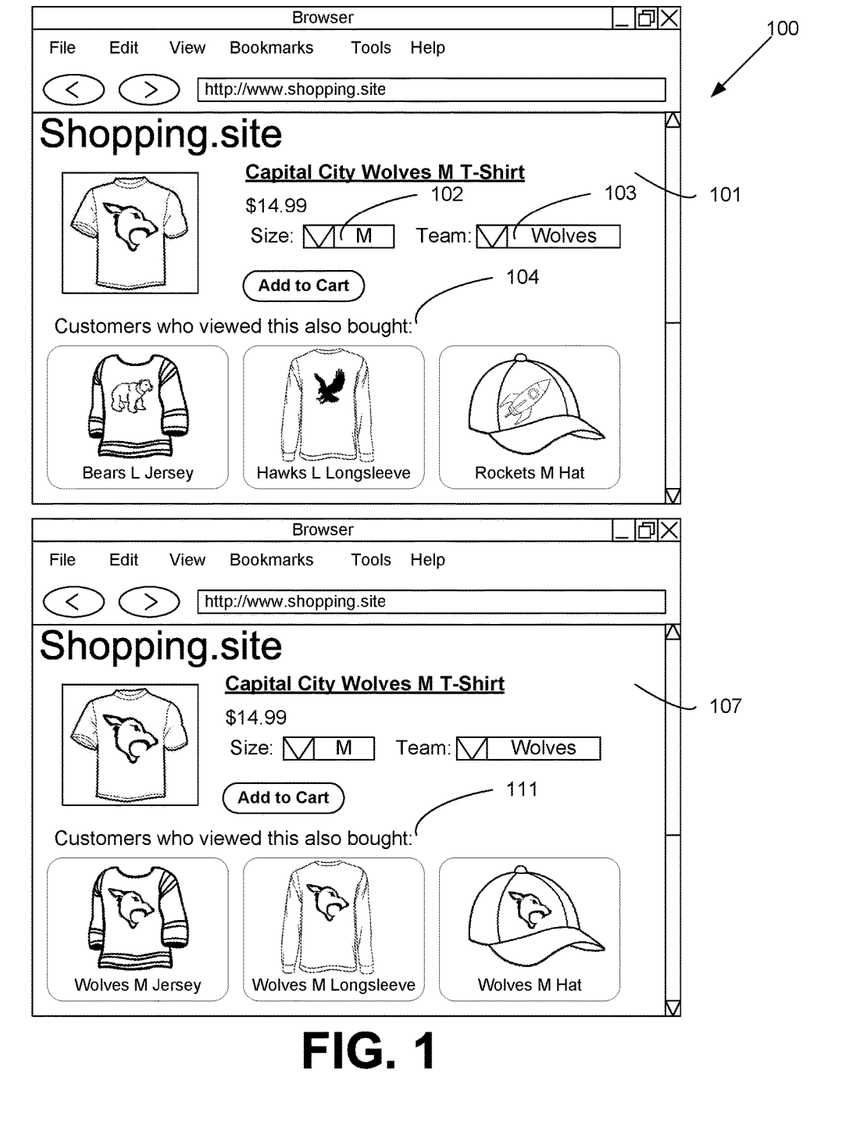
FIG. 1 is an example scenario according to various embodiments of the present disclosure.

With reference to FIG. 1, shown is an example scenario 100 depicting two user interfaces rendering network pages served by an electronic commerce system according to various embodiments. The network page 101 is a product detail page for a t-shirt for a sports team "Capital City Wolves." In this example, it is understood that the items sold through the electronic commerce system are encoded as a taxonomy, with the t-shirt corresponding to a parent node. The t-shirt parent node groups together child nodes each corresponding to a different pairing of sports team and size. Thus, the network page 101 corresponds to the child node for the "Capital City Wolves."

Included in the network page 101 are dropdown menus 102 and 103, allowing for a selection of a size and team, respectively, for the t-shirt. Also included in the network page 101 is a product listing 104 for various products related to the item browsed in the network page 101. In this example, a correlation has been identified between the t-shirt parent node and the jersey parent node, long-sleeved shirt parent node, and hat parent node, respectively. The product listing 104 has been generated using only parent node correlations. The selected child nodes for the "Bears" jersey, "Hawks" long-sleeved shirt, and "Rockets" hat are less relevant as they are for products related to teams and made in sizes other than the one currently being viewed.

In contrast, the network page 107 includes a product listing 111 generated by a correlation service as will be described below. This allows for both parent node correlations and child node correlations to be used in identifying the listed products. Thus, the jersey, long-sleeved shirt, and hat parent nodes are identified as being correlated with the t-shirt parent node, and the respective size M "Wolves" child nodes are selected as being correlated with the "Wolves" t-shirt child node.

Figure 2:
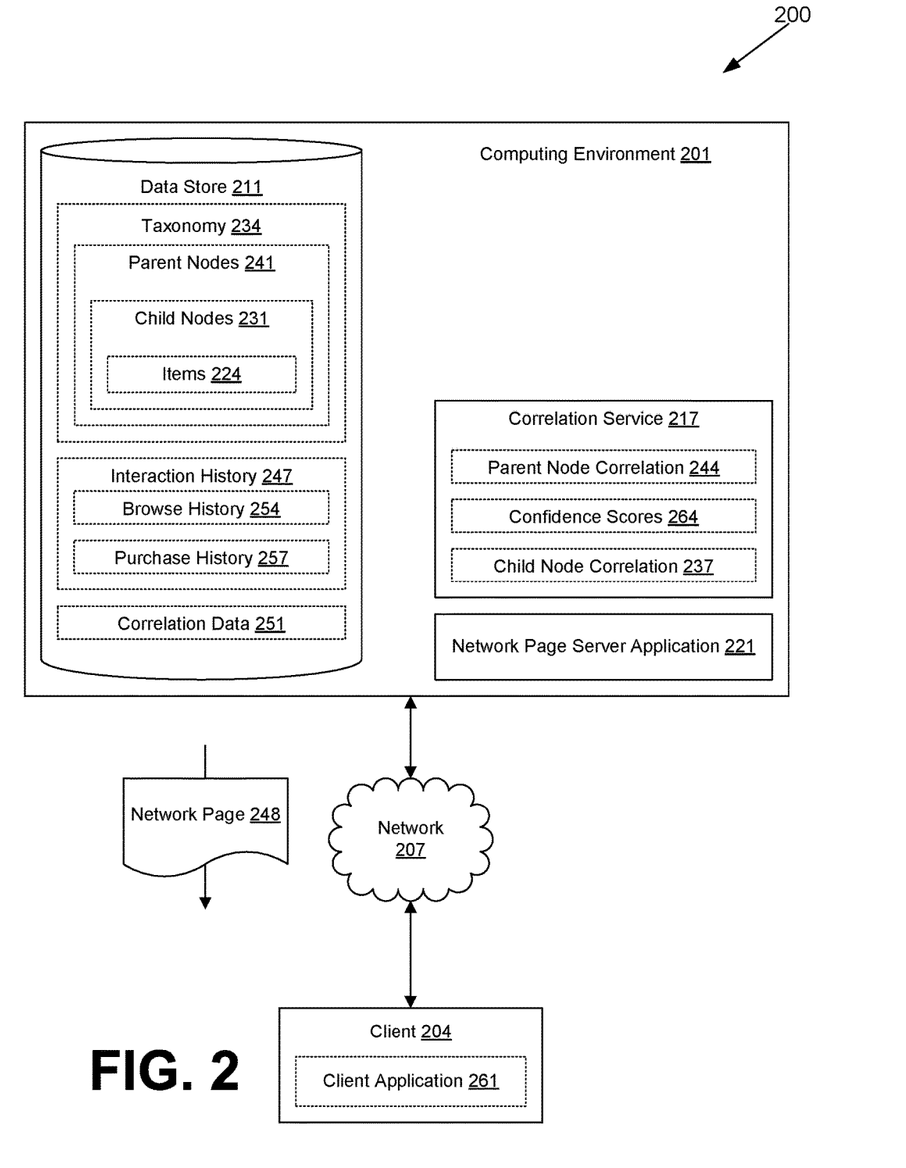
FIG. 2 is a drawing of a networked environment according to various embodiments of the present disclosure.

Turning now to FIG. 2, shown is a networked environment 200 according to various embodiments. The networked environment 200 includes a computing environment 201 and a client 204, which are in data communication with each other via a network 207. The network 207 includes, for example, the Internet, intranets, extranets, wide area networks (WANs), local area networks (LANs), wired networks, wireless networks, or other suitable networks, etc., or any combination of two or more such networks. For example, such networks may comprise satellite networks, cable networks, Ethernet networks, and other types of networks.

The computing environment 201 may comprise, for example, a server computer or any other system providing computing capability. Alternatively, the computing environment 201 may employ a plurality of computing devices that may be arranged, for example, in one or more server banks or computer banks or other arrangements. Such computing devices may be located in a single installation or may be distributed among many different geographical locations. For example, the computing environment 201 may include a plurality of computing devices that together may comprise a hosted computing resource, a grid computing resource and/or any other distributed computing arrangement. In some cases, the computing environment 201 may correspond to an elastic computing resource where the allotted capacity of processing, network, storage, or other computing-related resources may vary over time.

Various applications and/or other functionality may be executed in the computing environment 201 according to various embodiments. Also, various data is stored in a data store 211 that is accessible to the computing environment 201. The data store 211 may be representative of a plurality of data stores 211 as can be appreciated. The data stored in the data store 211, for example, is associated with the operation of the various applications and/or functional entities described below.

The correlation service 217 is executed to identify correlations between items 224 encoded as child nodes 231 of a taxonomy 234, hereinafter referred to as child node correlations 244. To this end, the correlation service 217 may identify correlations between parent nodes 241 of the taxonomy 234, hereinafter referred to as parent node correlations 244. The correlation service 217 then uses a filtered or limited portion of interaction history 247 based on a parent node correlation 244 to find child node correlations 244 between the child nodes 231 of the correlated parent nodes 241.

The network page server application 221 is executed to encode network pages 217 such as web pages or other network content for communication to the client 204. For example, the network page server application 221 may also serve as a web server or other server processing requests from the client 204. The network page server application 221 may also track requests or other interactions from the client 204 as interaction history 247, as will be described below.

The data stored in the data store 211 includes, for example, a taxonomy 234 of items 224, interaction history 247, correlation data 251, and potentially other data. The taxonomy 234 may be encoded as a collection of logically connected nodes. The nodes may be encoded in a parent-child relationship. Thus, a parent node 241 may group together or logically relate one or more descendent child nodes 231. Each of the child nodes 231 may also serve as a parent node 241 further collecting descendent child nodes 231. The child nodes 231 may also serve as a leaf node corresponding to a respective item 224. A leaf node is considered a taxonomy node having no descendants. The items 224 of the taxonomy 234 correspond to any instance of information classifiable by the taxonomy. As a non-limiting example, items 224 may correspond to listings of products purchasable by an electronic commerce system. As another example, items 224 may correspond to data objects, files, or other data. In a further example, items 224 may correspond to records or listings of a database. Items 224 may also correspond to additional data as can be appreciated.

The interaction history 247 indicates a user interaction or action with respect to a particular parent node 241 or child node 231. For example, the interaction history 247 may include a browse history 254 indicating a browsing or viewing of a detail page of an item 224. The interaction history 247 may also include a purchase history 257 indicating a purchase, rental, or other acquisition of an item 224. Other interactions, such as a click-through, return, refund, or another action may also be indicated in the interaction history 247. The interaction history 247 may further indicate a user account, client 204, network 207 address, or other identifier indicating a performer of the respective interaction.

Correlation data 251 indicates a correlation identified by the correlation service 217 between a pair of nodes of the taxonomy 234. Accordingly, the correlation data 251 may indicate a parent node correlation 244 between a pair of parent nodes 241. The correlation data 251 may also indicate a child node correlation 237 between a pair of child nodes 231. The correlation data 251 may further indicate other correlations between nodes of the taxonomy 234.

The client 204 is representative of a plurality of client devices that may be coupled to the network 207. The client 204 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client 204 may include a display. The display may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client 204 may be configured to execute various applications such as a client application 261 and/or other applications. The client application 261 may be executed in a client 204, for example, to access network content served up by the computing environment 201 and/or other servers, thereby rendering a user interface on the display. To this end, the client application 261 may comprise, for example, a browser, a dedicated application, etc., and the user interface may comprise a network page 248, an application screen, etc. The client 204 may be configured to execute applications beyond the client application 261 such as, for example, email applications, social networking applications, word processors, spreadsheets, and/or other applications.

Next, a general description of the operation of the various components of the networked environment 200 is provided. Although several of the following examples describe the operation of the networked environment 200 in the context of an electronic commerce system, it is understood that the operations described are applicable to any system or implementation in which correlations between taxonomy nodes can be identified.

To begin, the network page server application 217 aggregates interaction history 247 according to client 204 interactions. For example, a client 204 browsing a detail network page 248 for an item 224 may be stored as browse history 254 for the child node 231 of the item 224. As another example, a client 204 consummating a purchase of an item 224 may be stored as purchase history 257 for the child node 231 of the item 224.

Next, the correlation service 217 uses the aggregated interaction history 247 to identify parent node correlations 244, indicating a correlation between a pair of parent nodes 241 in the taxonomy 234. To identify a correlated parent node 241 for a given parent node 241, the correlation service 217 may identify users or other entities having interacted with an item 224 serving as a child node 231 for the given parent node 241 based on the interaction history 247. The users may be identified as having performed a specific action with respect to an item 224, or identified as having performed any action with respect to the item 224. For example, the users may be identified has having browsed or purchased an item 224 serving as a child node 231 for the given parent node 241. As the users are identified based on activity with respect to the child nodes 231 of the given parent node 241, the interactions with respect to the child nodes 231 are effectively aggregated together or "rolled up" for treatment with respect to the given parent node 241.

The correlation service 217 then applies a correlation algorithm to the interaction history 247 of the identified users to identify parent nodes 241 correlated with the given parent node 241. For example, the correlation algorithm may be applied to instances of another action performed with respect to child nodes 231 of other parent nodes 241 to determine which of these parent nodes 241 are correlated with the given parent node 241. Such an action may be distinct from the action used for selecting users from the interaction history 247 as was described above. For example, the correlation service 217 may select users having browsed an item 224 grouped by the given parent node 241, and apply the correlation algorithm to instances of purchasing an item 224 grouped by another parent node 241.

The correlation algorithm may include a clustering algorithm, a machine learning algorithm, a statistical correlation algorithm, or another algorithm as can be appreciated. This may include calculating, for a parent node 241 reflected in the interaction history 247, a confidence score 264 indicating a confidence that a respective parent node 241 is correlated with the given parent node 241. A parent node correlation 244 may then be identified between the given parent node 241 and a parent node 241 whose confidence score 264 meets or exceeds a predefined threshold. In some embodiments, after identifying a parent node correlation 244, an indication of the parent node correlation 244 may be stored as correlation data 251 on the data store 211.

After identifying the parent node correlations 244, the correlation service 217 identifies child node correlations 237 between the child nodes 231 of one of the parent nodes 241 indicated in a parent node correlation 244 and the child nodes 231 of the other parent node 241 indicated in the parent node correlation 244. In some embodiments, this includes identifying, from the interaction history 247, users having performed a first interaction with respect to a given child node 231 of a first parent node 241 in a parent node correlation 244. Then, the correlation service 217 selects a subset of the interaction history 247 corresponding to those of the selected users having performed a second interaction with respect to a child node 231 of the second parent node 241 in the parent node correlation 244.

For example, the correlation service 217 may find a parent node correlation 244 between a first parent node 241 for t-shirts and a second parent node 241 for caps. The first parent node 241 for t-shirts may include a child node 231 for a "Capital City Wolves" t-shirt, corresponding to a variation of the t-shirt for a particular team. In order to identify child node correlations 237 between the "Capital City Wolves" t-shirt child node 231 and any of the child nodes 231 of the caps parent node 241, the correlation service 217 identifies users who have performed some action with respect to the "Capital City Wolves" t-shirt child node 231, such as users having bought or purchased the item 224 for the child node 231. The correlation service 217 then selects a subset of the interaction history 247 for those selected users indicating another action with respect to any of the child nodes 231 of the caps parent node 241.

As was described above with respect to parent node correlations 244, the action serving as a basis for identifying users may be distinct from the action serving as a basis for selecting the subset of the interaction history 247. For example, the correlation service 217 may identify users having browsed a particular t-shirt child node 231, and select the subset of the interaction history 247 as instances of purchasing any cap classified into a cap parent node 241 by those users.

The correlation service 217 then applies another correlation algorithm to the selected interaction history 247 to identify child nodes 231 correlated with the given child node 231. This may include calculating confidence scores 264 indicating a confidence that a child node 231 is correlated with a given child node 231. A child node correlation 237 may then be identified in response to the confidence scores 264 meeting or exceeding a predefined threshold. In some embodiments, the predefined threshold in determining child node correlations 237 may be less than the predefined threshold for determining parent node correlations 244, thereby applying a more relaxed standard for identifying the child node correlations 237. In embodiments in which multiple child nodes 231 have confidence scores 264 with respect to a given child node 231 meeting the predefined threshold, the child node correlation 237 may include the given child node 231 and one of the child nodes 231 having a highest confidence score 264. Child node correlations 237 may also be identified by another approach.

The resulting child node correlation 237 indicates a correlation between child nodes 231 having respective parent nodes 241 represented in a parent node correlation 244. In some embodiments, the correlation service 217 may identify child node correlations 237 for a given parent node 241 by iterating through each of its child nodes 231 to find respective child node correlations 237. In some embodiments, the correlation service 217 may store indications of the child node correlations 237 as correlation data 251. This may include replacing a correlation data 251 entry for a parent node correlation 244 with child node correlations 237 for one of the parent nodes 241 indicated in the parent node correlation 244.

The correlation service 217 may be configured to identify parent node correlations 244 and child node correlations 237 at predefined intervals, thereby updating the correlation data 251. In some embodiments, the parent node correlations 244 may be identified at intervals greater than, equal to, or less than the interval for identifying child node correlations 237.

In some embodiments, the network page server application 221 may load instances of correlation data 251 in response to a request for a network page 248. For example, in response to a request for a product detail network page 248 for a given child node 231, the network page server application 221 may query the data store 211 for child node correlations 237 corresponding to the requested child node 231. If a child node correlation 237 has been identified, the network page server application 221 may encode a navigation aid such as a link or hyperlink to the correlated child node 231. If no child node correlation 237 has been identified for the requested child node 231, the network page server application 221 may access a parent node correlation 244 for a parent node 241 of the requested child node 231. The network page server application 221 may then include a navigation aid directed to the parent node 241 indicated in the parent node correlation 244.

Figure 3:
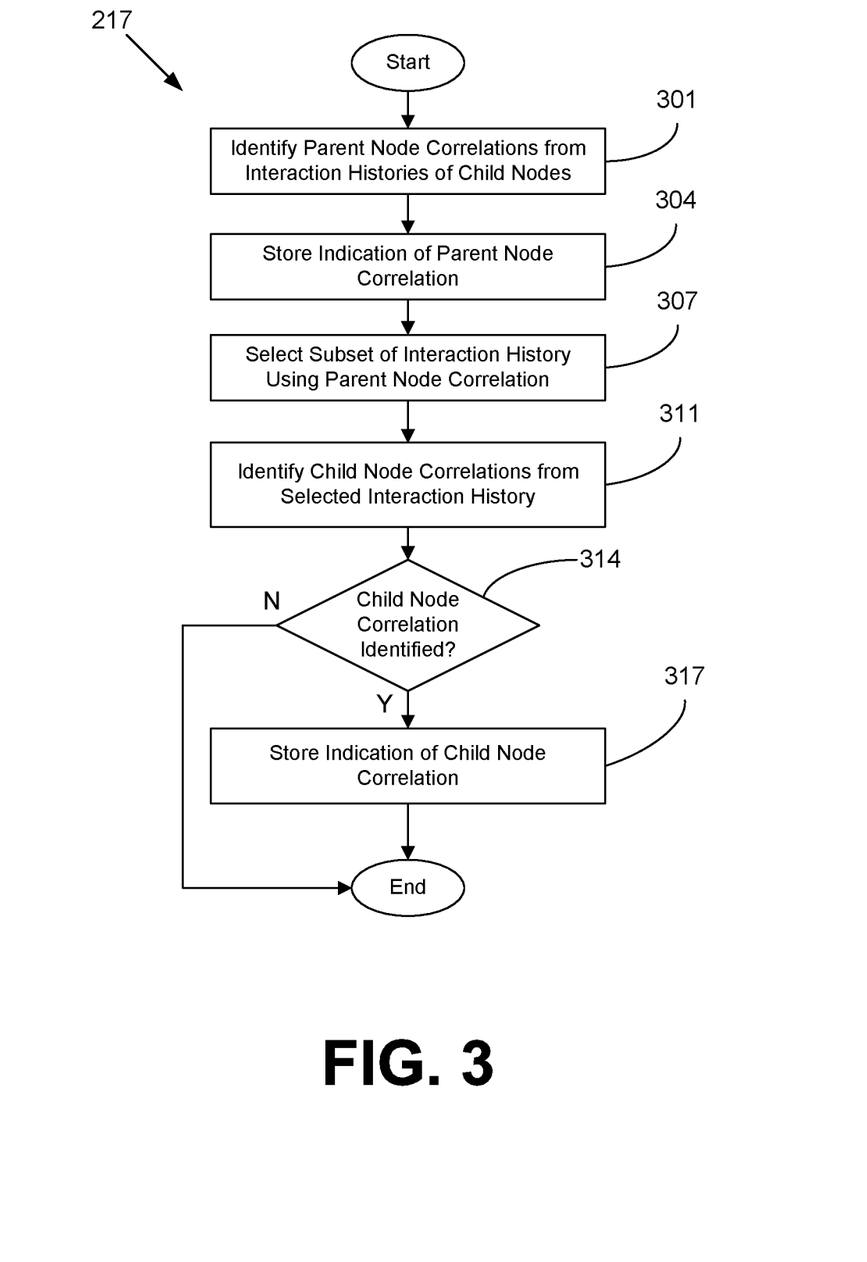
FIG. 3 is a flowchart illustrating one example of functionality implemented as portions of a correlation service executed in a computing environment in the networked environment of FIG. 2 according to various embodiments of the present disclosure.

Moving on to FIG. 3, shown is a flowchart that provides one example of the operation of a portion of the correlation service 217 according to various embodiments. It is understood that the flowchart of FIG. 3 provides merely an example of the many different types of functional arrangements that may be employed to implement the operation of the portion of the correlation service as described herein. As an alternative, the flowchart of FIG. 3 may be viewed as depicting an example of elements of a method implemented in the computing environment 201 (FIG. 3) according to one or more embodiments.

Beginning with box 301, the correlation service 217 uses aggregated interaction history 247 (FIG. 2) to identify parent node correlations 244, indicating a correlation between a pair of parent nodes 241 (FIG. 2) in a taxonomy 234 (FIG. 2). To identify a correlated parent node 241 for a given parent node 241, the correlation service 217 may identify users having performed a predefined action with an item 224 (FIG. 2) serving as a child node 231 (FIG. 2) for the given parent node 241. The predefined action may include, for example, a browsing of an item 224, a purchasing of an item 224, or another action. The users may be identified by accessing the interaction history 247 (FIG. 2) to identify instances of the specific interaction and the associated users.

The correlation service 217 then applies a correlation algorithm to the interaction history 247 of the identified users to identify parent nodes 241 correlated with the given parent node 241. The interaction history 247 of the identified users may be correlated according to a particular action with respect to another parent node 241 distinct from the given parent node 241. Such an action may be distinct from the action used for selecting users from the interaction history 247 as was described above. For example, the correlation service 217 may select users having browsed an item 224 grouped by the given parent node 241, and apply the correlation algorithm to instances of purchasing an item 224 grouped by another parent node 241.

Applying the correlation algorithm to the selected instances of the interaction history 247 may include calculating, for each parent node 241 reflected in the interaction history 247 as being associated with the specified interaction, confidence scores 264 (FIG. 2) with respect to the given parent node 241. A parent node correlation 244 may then be identified between the given parent node 241 and a parent node 241 whose confidence score 264 meets or exceeds a predefined threshold.

After identifying the parent node correlation 244, in box 304, the correlation service 217 stores an indication of the parent node correlation 244 as correlation data 251 in the data store 211. Next, in box 307, the correlation service 217 selects a subset of the interaction history 247 for identifying a child node correlation 237 (FIG. 2) for a child node 231 (FIG. 2) of a parent node 241 indicated in the previously identified parent node correlation 244. In some embodiments, this includes identifying, from the interaction history 247, users having performed a first interaction with respect to a given child node 231 of a first parent node 241 in a parent node correlation 244. Then, the correlation service 217 selects a subset of the interaction history 247 corresponding to those of the selected users having performed a second interaction with respect to any child node 231 of the second parent node 241 in the parent node correlation 244.

The correlation service 217 then identifies child node correlations 237 for the given child node 231 by applying another correlation algorithm to the selected subset of the interaction history 247. This may include calculating confidence scores 264 for the child nodes 231 reflected in the interaction history 247 as being associated with the respective interaction. The confidence scores 264 indicate a confidence that a child node 231 is correlated with the given child node 231. A child node correlation 237 may then be identified in response to the confidence scores 264 meeting or exceeding a predefined threshold. In embodiments in which multiple child nodes 231 have confidence scores 264 with respect to a given child node 231 meeting the predefined threshold, the child node correlation 237 may include the given child node 231 and one of the child nodes 231 having a highest confidence score 264. Child node correlations 237 may also be identified by another approach.

If, in box 314, no child node correlation 237 are determined to have been identified, the process ends. Otherwise, the process advances to box 317 where the correlation service 217 may stores indications of the child node correlations 237 as correlation data 251 in the data store 211. This may include replacing a correlation data 251 entry for a parent node correlation 244 with child node correlations 237 for the parent node 241 of the given child node 231. After storing the indication of the child node correlation 237, the process ends.

Figure 4:
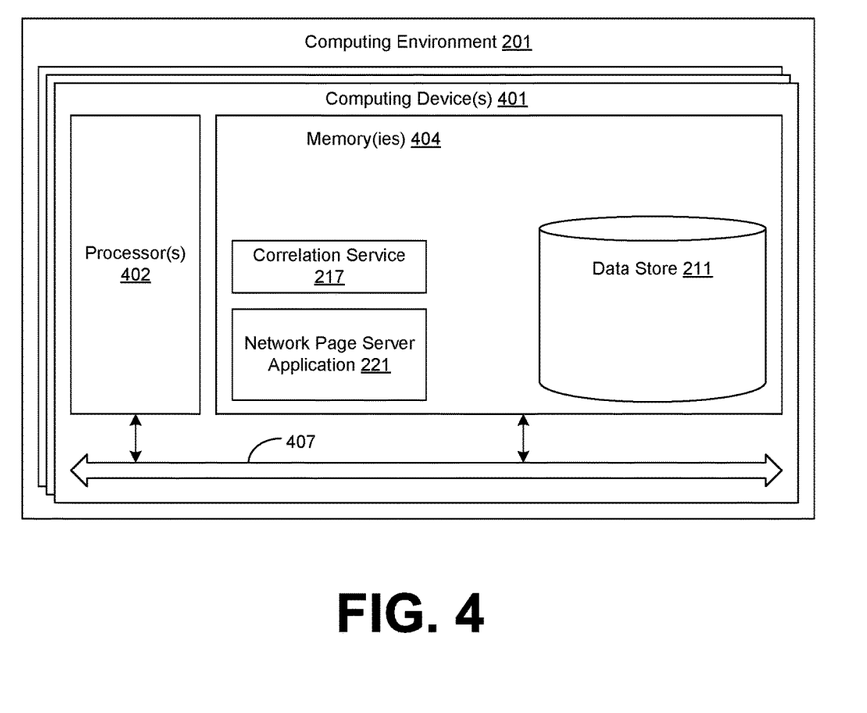
FIG. 4 is a schematic block diagram that provides one example illustration of a computing environment employed in the networked environment of FIG. 1 according to various embodiments of the present disclosure.

With reference to FIG. 4, shown is a schematic block diagram of the computing environment 201 according to an embodiment of the present disclosure. The computing environment 201 includes one or more computing devices 501. Each computing device 501 includes at least one processor circuit, for example, having a processor 502 and a memory 504, both of which are coupled to a local interface 507. To this end, each computing device 501 may comprise, for example, at least one server computer or like device. The local interface 507 may comprise, for example, a data bus with an accompanying address/control bus or other bus structure as can be appreciated.

Stored in the memory 504 are both data and several components that are executable by the processor 502. In particular, stored in the memory 504 and executable by the processor 502 are a correlation service 217 and network page server application 221, and potentially other applications. Also stored in the memory 504 may be a data store 211 and other data. In addition, an operating system may be stored in the memory 504 and executable by the processor 502.

It is understood that there may be other applications that are stored in the memory 504 and are executable by the processor 502 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 504 and are executable by the processor 502. In this respect, the term "executable" means a program file that is in a form that can ultimately be run by the processor 502. Examples of executable programs may be, for example, a compiled program that can be translated into machine code in a format that can be loaded into a random access portion of the memory 504 and run by the processor 502, source code that may be expressed in proper format such as object code that is capable of being loaded into a random access portion of the memory 504 and executed by the processor 502, or source code that may be interpreted by another executable program to generate instructions in a random access portion of the memory 504 to be executed by the processor 502, etc. An executable program may be stored in any portion or component of the memory 504 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 504 is defined herein as including both volatile and nonvolatile memory and data storage components. Volatile components are those that do not retain data values upon loss of power. Nonvolatile components are those that retain data upon a loss of power. Thus, the memory 504 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 502 may represent multiple processors 502 and/or multiple processor cores and the memory 504 may represent multiple memories 504 that operate in parallel processing circuits, respectively. In such a case, the local interface 507 may be an appropriate network that facilitates communication between any two of the multiple processors 502, between any processor 502 and any of the memories 504, or between any two of the memories 504, etc. The local interface 507 may comprise additional systems designed to coordinate this communication, including, for example, performing load balancing. The processor 502 may be of electrical or of some other available construction.

Although the correlation service 217, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowchart of FIG. 3 shows the functionality and operation of an implementation of portions of the correlation service. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 502 in a computer system or other system. The machine code may be converted from the source code, etc. If embodied in hardware, each block may represent a circuit or a number of interconnected circuits to implement the specified logical function(s).

Although the flowchart of FIG. 3 shows a specific order of execution, it is understood that the order of execution may differ from that which is depicted. For example, the order of execution of two or more blocks may be scrambled relative to the order shown. Also, two or more blocks shown in succession in FIG. 3 may be executed concurrently or with partial concurrence. Further, in some embodiments, one or more of the blocks shown in FIG. 3 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the correlation service 217, that comprises software or code can be embodied in any non-transitory computer-readable medium for use by or in connection with an instruction execution system such as, for example, a processor 502 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the correlation service 217, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 501, or in multiple computing devices in the same computing environment 103. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in at least one computing device, the program, when executed, causing the at least one computing device to at least:
   identify, from a plurality of items embodied as a plurality of taxonomy nodes, a first correlation between a first taxonomy node among the plurality of taxonomy nodes and a second taxonomy node among the plurality of taxonomy nodes based at least in part on an interaction history with respect to the plurality of items and responsive to a first confidence score meeting a first predefined threshold;
   select a subset of the interaction history corresponding to a first child node of the first taxonomy node and at least one second child node of the second taxonomy node;
   identify, based at least in part on the subset of the interaction history, at least one second correlation between the first child node and a respective one of the at least one second child node responsive to at least one second confidence score meeting a second predefined threshold less than the first predefined threshold; and
   store an indication of the at least one second correlation in a data store.

2. The non-transitory computer-readable medium of claim 1, wherein the program further causes the at least one computing device to at least:
   load, from the data store, the indication in response to a request for a network page associated with the first child node; and
   generate the network page comprising a navigation aid directed to the respective one of the at least one second child node.

3. The non-transitory computer-readable medium of claim 1, wherein the interaction history comprises at least one of a browse history or a purchase history.

4. A system, comprising:
   A memory configured to store computer-readable instructions thereon; and
   at least one computing device configured to, through the execution of the computer-readable instructions, at least:
      identify, from a plurality of items embodied as a plurality of taxonomy nodes, a first correlation between a first taxonomy node of the plurality of taxonomy nodes and a second taxonomy node of the plurality of taxonomy nodes based at least in part on an interaction history with respect to the plurality of items;
      select a subset of the interaction history corresponding to a first child node of the first taxonomy node and at least one second child node of the second taxonomy node; and
      identify, based at least in part on the subset of the interaction history, at least one second correlation between the first child node and a respective one of the at least one second child node.

5. The system of claim 4, wherein the interaction history comprises at least one of a browse history or a purchase history.

6. The system of claim 4, wherein selecting the subset of the interaction history comprises selecting the subset of the interaction history as indicating a first action taken with respect to the first child node and a second action taken with respect to the at least one second child node.

7. The system of claim 5, wherein the first action and the second action are distinct.

8. The system of claim 4, wherein the at least one computing device is further configured to identify the first correlation by identifying, based at least in part on the interaction history, the first correlation between the first taxonomy node and the second taxonomy node responsive to a confidence score meeting a predefined threshold.

9. The system of claim 8, wherein the predefined threshold is a first predefined threshold, the confidence score is a first confidence score, and wherein the at least one computing device is further configured to identify the at least one second correlation by identifying at least one second confidence score corresponding to the first child node and the respective one of the at least one second child node meeting a second predefined threshold.

10. The system of claim 9, wherein the second predefined threshold is less than the first predefined threshold.

11. The system of claim 9, wherein the at least one computing device is further configured to identify the at least one second confidence score by identifying, from the at least one second child node, the respective one of the at least one second child node as having a highest confidence score meeting the second predefined threshold.

12. The system of claim 4, wherein the at least one computing device is further configured to at least store an indication of the at least one second correlation in a data store.

13. The system of claim 4, wherein the at least one computing device is further configured to at least generate, in response to a request for a network page associated with the first child node, the network page comprising a navigation aid directed to the respective one of the at least one second child node.

14. A method, comprising:
identifying, by at least one computing device, from a plurality of items embodied as a plurality of taxonomy nodes, a first correlation between a first taxonomy node of the plurality of taxonomy nodes and a second taxonomy node of the plurality of taxonomy nodes based at least in part on an interaction history with respect to the plurality of items;
selecting, by the at least one computing device, a subset of the interaction history corresponding to a first child node of the first taxonomy node and at least one second child node of the second taxonomy node; and
identify, by the at least one computing device, at least one second correlation between the first child node and a respective one of the at least one second child node based at least in part on the subset of the interaction history.

15. The method of claim 14, wherein identifying the first correlation is performed at a first interval, and identifying the at least one second correlation is performed at a second interval distinct from the first interval.

16. The method of claim 14, wherein the second interval is less than the first interval.

17. The method of claim 14, wherein the subset of the interaction history is selected as indicating a browse action with respect to the first child node and a purchase action taken with respect to the at least one second child node.

18. The method of claim 14, wherein identifying the first correlation comprises identifying, based at least in part on the interaction history, the first correlation between the first taxonomy node and the second taxonomy node responsive to a confidence score meeting a predefined threshold.

19. The method of claim 18, wherein the predefined threshold is a first predefined threshold, the confidence score is a first confidence score, and wherein identifying the at least one second correlation comprises identifying at least one second confidence score corresponding to the first child node and the respective one of the at least one second child node meeting a second predefined threshold less than the first predefined threshold.

20. The method of claim 14, further comprising replacing, in a data store, a first indication of the first correlation with at least one second indication of the at least one second correlation.

* * * * *